Patented Apr. 16, 1940

2,197,605

UNITED STATES PATENT OFFICE 2,197,605

OPAQUE WHITE PIGMENT AND PAINT AND METHOD OF MAKING SAME

Louis E. Barton, Windsor, Conn.

No Drawing. Application December 9, 1938, Serial No. 244,767

8 Claims. (Cl. 23—110)

My invention relates generally to pigments, their preparation and application, and more specifically to a new type of opaque white pigments comprising combinations of the oxides of lead, zinc and silicon, together with improved methods of making same and their application in paints.

In my co-pending application for patent Serial Number 144,484 filed in the United States Patent Office May 24, 1937, of which this is a continuation-in-part, I have disclosed a method of making both white and colored composite pigments which, briefly described, consists in heating an intimate mixture of at least three oxides of the group of elements, lead, zinc, aluminum and silicon to temperatures at which they will chemically combine in the solid phase without fusion.

In my application referred to examples of the various pigments were given in tabular form and arranged in groups according to the nature of the pigments. Such examples showed particularly pigments having definite or regular chemical compositions, including the lead zinc silicates having the chemical formulae, $PbO \cdot ZnO \cdot 2SiO_2$ and $PbO \cdot ZnO \cdot SiO_2$, and suitable temperature conditions for making the various products; but it was explained that pigments having proportions other than the regular formula could be prepared and that wider temperature ranges than shown in the examples could be used. Now it is the purpose of this application to show the working of my process in preparing the lead zinc silicates, both definite or regular molecular compounds and irregular formulae, the temperature range and other conditions of operation and the properties of the resulting pigment products.

I have discovered that not only can I make such definite lead zinc silicates as $$PbO \cdot ZnO \cdot 2SiO_2$$

and $$PbO \cdot ZnO \cdot SiO_2$$

but I can make lead zinc silicates having any desired proportions between the two regular formulae given and also products lower and others higher in the basic oxides, lead and zinc, than contained in the regular formulae referred to.

Lead zinc silicates having compositions between the two definite compounds referred to in the preceding paragraph probably contain both compounds. Those containing less basic oxide than $PbO \cdot ZnO \cdot 2SiO_2$ and those containing more basic oxide than $PbO \cdot ZnO \cdot SiO_2$ are probably combinations of those compounds with other definite compounds containing respectively less and more of the basic oxide; however, where either the basic or acidic oxides are in considerable excess it may be that a little of such excess is present in solid solution or possibly in the free state.

Before giving detailed examples showing the operation of my process I shall give some general information which applies to all my lead zinc silicate pigments.

As a source of the various oxides, I may use the oxides as such, or any compounds of the elements which will yield the oxides upon heating. For example, as a source of lead oxide I can use either litharge (PbO) or red lead ($Pb_3O_4$) or lead peroxide ($PbO_2$) or white lead $$(2PbCO_3 \cdot PbH_2O_2)$$

As a source of zinc I can use the oxides as such, or such compounds as zinc sulphate. The so-called leaded zinc oxides are also available, supplying zinc oxide and a part of the necessary lead oxide. As a source of silica I can use either the natural, finely-powdered material or the artificially prepared silica in either anhydrous or hydrated form.

I first thoroughly mix the materials in the required proportions either by dry-milling or, preferably, by wet-milling, thereby reducing particle size and also assuring a very close association of the ingredients. The milling may be done either in a batch or a continuous type of mill; in either case by using a porcelain or silex lining to avoid contamination of materials.

The slurry from the wet-mill is dewatered as by settling and decantation and/or filtration. Any suitable equipment may be used, such as Dorr tanks and filter presses.

The wet pulp, prepared by either of the methods outlined above, is then charged directly into the heating furnace, or it may be preliminarily dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. In furnaces where products of combustion contact the charge a neutral or oxidizing flame should be maintained to avoid possible reduction of metallic oxides.

The time required in the calcining zone depends upon the temperature. The higher the temperature, within the permissible range, the shorter the time. The preferred temperature range for making all my lead zinc silicate pigments is 650 to 750° C., since within that range the reaction proceeds fairly rapidly and yields products having a soft texture, but, as will be seen from the examples to be given later, all my pigments can be made at temperatures either lower or higher than the preferred range. The permissible temperature range as shown by the examples is from about 520° C. to about 800° C., but the lower temperatures have the disadvantage that the time required is much longer and the higher temperatures yield a coarser texture which requires more milling.

Some of my new composite pigments are sufficiently fine, as discharged from the calcining furnace, if the lower available temperatures have been maintained, to be used as pigments for paints, but usually milling is required to break down aggregates and also to reduce particle size.

Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates.

In general I find it desirable to proportion my pigments to give definite molecular chemical compounds, but the rule is not invariable for I have found in some cases that very small amounts of one oxide with a preponderance of others has a determining effect. I have also found it desirable in some cases to proportion the compound to obtain maximum effect of one or more oxides in proportion to the total. Thus where maximum opacity or hiding power is desired the lead and zinc oxides should be as high as permissible since the refractive index of silica is such that it contributes very little to the opacity of the pigment when it is mixed with such vehicles as linseed oil.

In general I have found it advisable to have the sum of the metallic oxide contents of my white pigments, lead and zinc oxide, at least 50% of the pigment product to ensure efficiency in their application in paints. While pigments of lower metallic oxide contents can be made they are too low in hiding power to function importantly as opaque white pigments.

The following examples show the detailed operation of my process and a few of the lead zinc silicate pigments that can be made.

EXAMPLE 1

A mixture of 45.7 parts of lead oxide, PbO, 16.8 parts of zinc oxide and 37.5 parts silica was intimately blended by dry-milling. The mixture was then calcined for 20 hours at a temperature of 520 to 550° C.

The calcined product was a fine white pigment having a very soft texture. The specific gravity of the pigment was 4.15. Hiding power 70, compared with white lead standard=100. Chemical composition:

|  | Per cent |
|---|---|
| Lead oxide | 45.70 |
| Zinc oxide | 16.80 |
| Silica | 37.50 |

EXAMPLE 2

A mixture of 45.7 parts of lead oxide, PbO, 16.8 parts of zinc oxide and 37.5 parts of silica was intimately blended by dry-milling. The mixture was then calcined for 1 hour at 800° C.

The calcined product was a slightly granular powder having an excellent white color. The product was then dry-milled, yielding a fine pigment of soft texture. Chemical composition:

|  | Per cent |
|---|---|
| Lead oxide | 45.70 |
| Zinc oxide | 16.80 |
| Silica | 37.50 |

EXAMPLE 3.—Lead zinc silicate, PbO.ZnO.2SiO$_2$

A mixture of 620 parts of basic carbonate white lead (equivalent to 526 parts of lead oxide, PbO), 191 parts of zinc oxide and 283 parts of silica was intimately blended by wet-milling for 1 hour and the charge dewatered and dried. The dry mixture was then calcined for 3 hours at a temperature of 650 to 700° C.

The calcined product was a fine white pigment having a soft texture and good hiding power. Specific gravity, 4.91. Chemical composition:

|  | Per cent |
|---|---|
| Lead oxide | 52.60 |
| Zinc oxide | 19.10 |
| Silica | 28.30 |

EXAMPLE 4

A mixture of 57 parts of lead oxide, PbO, 21 parts of zinc oxide and 22 parts of silica was intimately blended by dry-milling. The mixture was then calcined for 22 hours at a temperature of 550 to 580° C.

The calcined product was a fine white pigment having a soft texture. The specific gravity of the pigment was 5.18. Chemical composition:

|  | Per cent |
|---|---|
| Lead oxide | 57.00 |
| Zinc oxide | 21.00 |
| Silica | 22.00 |

EXAMPLE 5

A mixture of 57 parts of lead oxide, PbO, 21 parts of zinc oxide and 22 parts of silica was intimately blended by dry-milling. The mixture was then calcined for 1 hour at 800° C.

The calcined product was a slightly granular powder having an excellent white color. The product was then dry-milled, yielding a fine pigment of soft texture. Chemical composition:

|  | Per cent |
|---|---|
| Lead oxide | 57.00 |
| Zinc oxide | 21.00 |
| Silica | 22.00 |

EXAMPLE 6.—Lead zinc silicate, PbO.ZnO.SiO$_2$

A mixture of 184 parts of lead oxide, PbO, 67 parts of zinc oxide and 50 parts of silica was intimately blended by wet-milling for 1½ hours and the charge dewatered and dried. The dry mixture was then calcined for 2 hours at 700° C. The calcined product was wet-milled for 2¼ hours and the charge dewatered and dried.

The resulting pigment had an excellent white color, soft texture, a hiding power approximately that of white lead, and an oil absorption, 12.44 parts of oil per 100 parts of pigment. Specific gravity, 5.68. Chemical composition:

|  | Per cent |
|---|---|
| Lead oxide | 61.50 |
| Zinc oxide | 22.00 |
| Silica | 16.50 |

Example 7

A mixture of 813 parts of lead oxide, 55 parts of zinc oxide and 132 parts of silica were intimately blended by wet-milling for 1 hour and the charge dewatered and dried. The dry mixture was then calcined for 2½ hours at 675° C. The calcined product was an excellent white pigment having a soft texture, hiding power 115 compared with white lead taken as 100, and oil absorption 10.60 parts oil to 100 parts of pigment. Specific gravity, 6.53. Chemical composition:

| | Per cent |
|---|---|
| Lead oxide | 81.30 |
| Zinc oxide | 5.50 |
| Silica | 13.20 |

Example 8

A mixture of 48 parts of lead oxide, PbO, 18 parts of zinc oxide and 34 parts silica was intimately blended by dry-milling. The mixture was then calcined for 1 hour at a temperature of 850° C.

The calcined product had a white color but had sintered slightly to a hard gritty texture.

After milling to a fine powder the product had a hiding power of 45 compared to white lead standard taken as 100. Chemical composition:

| | Per cent |
|---|---|
| Lead oxide | 48.00 |
| Zinc oxide | 18.00 |
| Silica | 34.00 |

The foregoing Examples 1 and 2 and also 4 and 5 show the considerable temperature range which can be successfully used in making my lead zinc silicate pigments. Example 8 shows the limitation in temperature range; 850° C. being too high to yield a satisfactory pigment as indicated by the texture of the calcined product and the low hiding power of the milled pigment as compared, for instance, with the product of Example 1. Example 7 is illustrative of a lead zinc silicate especially proportioned to give increased hiding power. The zinc oxide was reduced to one-fourth of that shown in Example 6, the lead oxide increased and silica adjusted to chemically balance the basic and acidic oxides.

Two classes of white pigments are generally recognized: (1) The opaque white pigments, such as white lead, zinc oxide and titanium pigments which impart opacity and whiteness when mixed with oil or other organic vehicle; and (2) The extender pigments such as whiting and china clay which do not impart appreciable opacity when similarly mixed with vehicles.

The opaque pigments of class (1) are further sub-divided into two classes: (a) Those which are reactive or capable of combining chemically or physico-chemically with ingredients of the vehicle, such as white lead and zinc oxide; and (b) Those which are chemically inert, such as titanium pigments.

It is well known that the reactive pigments have a special value, not possessed by inert pigments, of enhancing certain desirable properties in paints and other products to which they are applied. For example, white lead has the property of combining with linseed oil and other vehicles to form a tough elastic coating which is very resistant to light and weather when spread and exposed. Zinc oxide reacts with oil and other vehicles of paint products to harden the film or coating thereby rendering it more resistant to abrasion as well as improving gloss, and when exposed is more resistant to dirt collection.

My white lead zinc silicate pigments belong to the class of reactive opaque white pigments. Their properties are such as to adapt them for use in various applications such as oil, enamel and lacquer type coatings and for other purposes such as rubber, linoleum and other floor coverings, vitrified enamels et cetera, but their outstanding characteristic is their property of imparting durability to paints when the pigments, either alone or in admixture with other pigments, are used with a vehicle such as linseed oil.

I claim as my invention:

1. The method of making a substantially pure, opaque white, lead zinc silicate pigment which consists in heating an intimate mixture of lead oxide, zinc oxide and silica in the temperature range 520 to 800° C. until the oxides chemically combine in the solid phase without fusion to form said pigment.

2. The method of making a substantially pure, opaque white, lead silicate pigment which consists in intimately mixing compounds of lead, zinc and silicon which upon heating yield respectively lead, zinc and silicon oxides, and then heating the mixture in the temperature range 520 to 800° C. until the oxides chemically combine in the solid phase without fusion to form said pigment.

3. The method of making an opaque white pigment consisting of the oxides of lead, zinc and silicon in the molecular equivalent proportions expressed by the chemical formula $PbZnSi_2O_6$, which consists in heating an intimate mixture of the said oxides in the temperature range 650 to 750° C. until they chemically combine in the solid phase without fusion to form said pigment and finally milling the calcined product.

4. The method of making an opaque white pigment consisting of the oxides of lead, zinc and silicon in the molecular equivalent proportions expressed by the chemical formula, $PbZnSiO_4$, which consists in heating an intimate mixture of the said oxides in the temperature range 650 to 750° C. until they chemically combine in the solid phase without fusion to form said pigment and finally milling the calcined product.

5. An opaque white pigment consisting of the chemically combined oxides of lead, zinc and silicon.

6. An opaque white pigment consisting of the oxides of lead, zinc and silicon and containing 45 to 81% lead oxide, 5 to 22% zinc oxide and the balance silica.

7. An opaque white pigment consisting of the chemically combined oxides of lead, zinc and silicon and having a composition expressed by the chemical formula $PbZnSi_2O_6$.

8. An opaque white pigment consisting of the chemically combined oxides of lead, zinc and silicon and having a composition expressed by the chemical formula $PbZnSiO_4$.

LOUIS E. BARTON.